(12) United States Patent
Miyanaga et al.

(10) Patent No.: US 9,254,519 B2
(45) Date of Patent: Feb. 9, 2016

(54) COMPOSITE MATERIAL, PART FOR CONTINUOUS CASTING, CONTINUOUS CASTING NOZZLE, CONTINUOUS CASTING METHOD, CAST MATERIAL, AND MAGNESIUM ALLOY CAST COIL MATERIAL

(75) Inventors: Michimasa Miyanaga, Osaka (JP); Takeshi Uchihara, Osaka (JP); Masatada Numano, Osaka (JP); Yukihiro Oishi, Osaka (JP); Nozomu Kawabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 510 days.

(21) Appl. No.: 13/702,008

(22) PCT Filed: Jun. 3, 2011

(86) PCT No.: PCT/JP2011/062824
§ 371 (c)(1),
(2), (4) Date: Dec. 4, 2012

(87) PCT Pub. No.: WO2011/152529
PCT Pub. Date: Dec. 8, 2011

(65) Prior Publication Data
US 2013/0089457 A1    Apr. 11, 2013

(30) Foreign Application Priority Data

Jun. 4, 2010  (JP) .................................. 2010129285
Jun. 4, 2010  (JP) .................................. 2010129286
Jun. 3, 2011  (JP) .................................. 2011125063
Jun. 3, 2011  (JP) .................................. 2011125064

(51) Int. Cl.
*B22D 11/00*   (2006.01)
*B22D 11/06*   (2006.01)
(Continued)

(52) U.S. Cl.
CPC .......... *B22D 11/001* (2013.01); *B22D 11/0622* (2013.01); *B22D 11/0642* (2013.01);
(Continued)

(58) Field of Classification Search
CPC .. B22D 11/001; B22D 11/0622; B22D 11/10; C22C 23/00; C09D 1/00
See application file for complete search history.

(56) References Cited

U.S. PATENT DOCUMENTS

2009/0020567 A1* 1/2009 Numano et al. .............. 222/594
2012/0128997 A1* 5/2012 Numano et al. .............. 428/586

FOREIGN PATENT DOCUMENTS

JP        2006-015361 A      1/2006
JP        WO 2006/003899 A1  1/2006
(Continued)

OTHER PUBLICATIONS

International Search Report for PCT/JP2011/062824 dated Aug. 16, 2011, pp. 1-5.

*Primary Examiner* — Veronica F Faison
(74) *Attorney, Agent, or Firm* — Ditthavong & Steiner, P.C.

(57) ABSTRACT

Provided is a composite material suitable for forming a part for continuous casting capable of producing cast materials of excellent surface quality for a long period of time and with which a molten metal is inhibited from flowing into a gap between a nozzle and a moving mold.
A composite material (nozzle 1) includes a porous body 2 having a large number of pores and a filler incorporated in at least part of a portion that comes into contact with the molten metal, the portion being part of a surface portion of the porous body. The filler incorporated in the porous body 2 is at least one selected from a nitride, a carbide, and carbon.

18 Claims, 1 Drawing Sheet

(51) Int. Cl.

| | |
|---|---|
| B22D 11/10 | (2006.01) |
| C09D 1/00 | (2006.01) |
| C22C 23/00 | (2006.01) |
| C04B 41/87 | (2006.01) |
| C04B 41/00 | (2006.01) |
| C04B 41/50 | (2006.01) |
| C04B 35/117 | (2006.01) |
| C04B 35/52 | (2006.01) |
| C04B 35/565 | (2006.01) |
| C04B 35/581 | (2006.01) |
| C04B 35/80 | (2006.01) |
| C04B 111/00 | (2006.01) |

(52) U.S. Cl.
CPC .............. *B22D11/10* (2013.01); *C04B 35/117* (2013.01); *C04B 35/52* (2013.01); *C04B 35/565* (2013.01); *C04B 35/581* (2013.01); *C04B 35/806* (2013.01); *C04B 41/009* (2013.01); *C04B 41/5059* (2013.01); *C04B 41/5063* (2013.01); *C04B 41/5064* (2013.01); *C04B 41/87* (2013.01); *C09D 1/00* (2013.01); *C22C 23/00* (2013.01); *C04B 2111/00879* (2013.01); *C04B 2235/3217* (2013.01); *C04B 2235/386* (2013.01); *C04B 2235/3865* (2013.01); *C04B 2235/5244* (2013.01); *C04B 2235/5436* (2013.01); *C04B 2235/5445* (2013.01); *C04B 2235/614* (2013.01); *C04B 2235/616* (2013.01); *C04B 2235/96* (2013.01); *C04B 2235/9607* (2013.01); *C04B 2235/9676* (2013.01); *Y10T 428/26* (2015.01); *Y10T 428/31678* (2015.04)

(56) References Cited

FOREIGN PATENT DOCUMENTS

| | | |
|---|---|---|
| JP | 2006-263784 A | 10/2006 |
| JP | 2008-161875 A | 1/2008 |

* cited by examiner

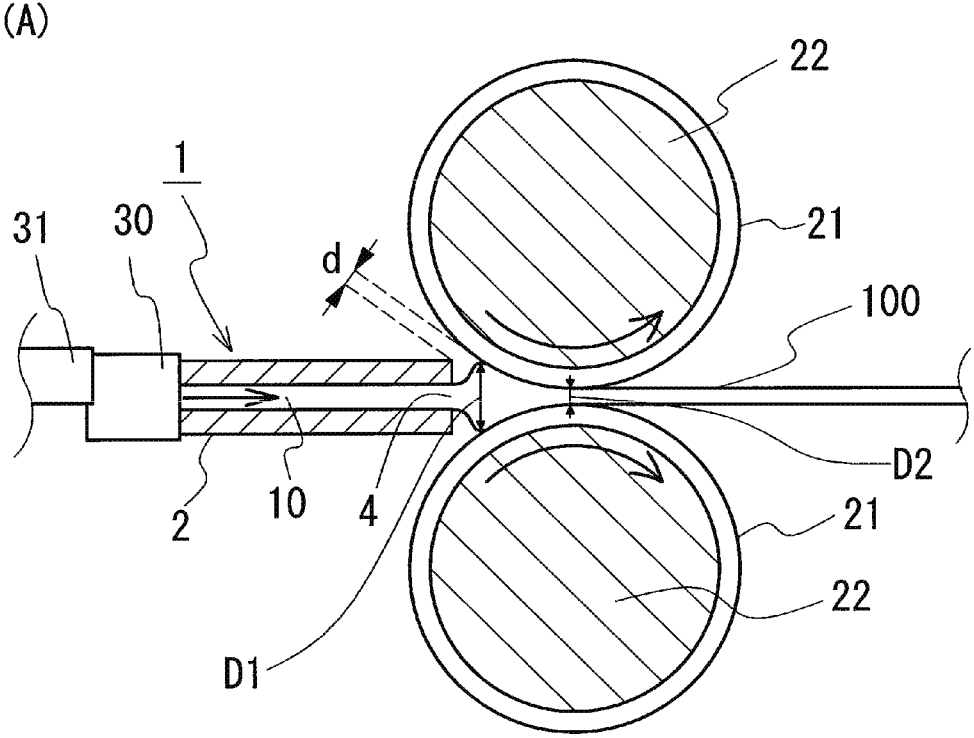
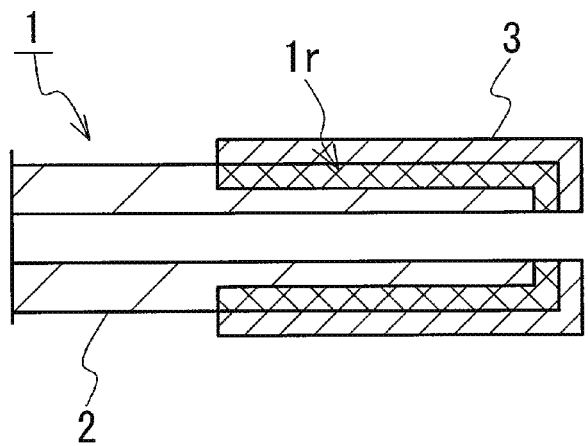

COMPOSITE MATERIAL, PART FOR CONTINUOUS CASTING, CONTINUOUS CASTING NOZZLE, CONTINUOUS CASTING METHOD, CAST MATERIAL, AND MAGNESIUM ALLOY CAST COIL MATERIAL

TECHNICAL FIELD

The present invention relates to a part for continuous casting suitable for manufacturing cast materials of pure magnesium or magnesium alloys and in particular to a composite material suitable for use in a continuous casting nozzle. The present invention also relates to a continuous casting method that uses the continuous casting nozzle and a cast material and a magnesium alloy cast coil material obtained by the method.

BACKGROUND ART

Continuous casting has been known in which a molten metal melted in a melting furnace is supplied to a moving mold constituted by rolls, belts, etc., from a tundish, and cooled and solidified by being brought into contact with the moving mold so as to continuously produce cast materials. Molten metal is supplied to the moving mold via a nozzle. Examples of this nozzle for casting include those described in Patent Literatures 1 and 2. In Patent Literature 1, a nozzle having a tip having a three-layer structure that includes a high-heat-conductivity layer, a low-heat-conductivity-layer, and a high-strength elastic layer is disclosed which reduces variation in the temperature of the molten metal in the width direction of the material during casting. Patent Literature 2 discloses a nozzle suitable for use in continuous casting of pure magnesium or magnesium alloys. This nozzle includes a main body composed of an oxide material in order to prevent reaction between the nozzle-forming material and the molten metal of magnesium which is an active metal, and a coating layer composed of a low-oxygen material and disposed on a surface of the main body that contacts the molten metal.

CITATION LIST

Patent Literature

PTL 1: Japanese Unexamined Patent Application Publication No. 2006-015361
PTL 2: Japanese Unexamined Patent Application Publication No. 2006-263784

SUMMARY OF INVENTION

Technical Problem

However, when the molten metal is being supplied to the moving mold from the nozzle, the nozzle constantly comes into contact with very hot molten metal. Thus, constituent components of the part may be consumed by the molten metal or wear and deterioration of parts occur due to oxidation by heat of the molten metal and penetration of the molten metal. This may result in the failure of parts in some cases. Since deformation of parts due to deterioration of and compositional changes in molten metal render the flow of the molten metal nonuniform, it becomes difficult to continue continuous casting for a long period of time.

Furthermore, a gap is formed between the nozzle and the moving mold at a position where the molten metal is supplied. This gap is generated in a region defined by the moving mold and an extension line extending from an inner peripheral edge of a nozzle tip in a nozzle axis direction. A small quantity of molten metal that has flown into the gap is cooled by the moving mold and solidifies in the gap, thereby locally disturbing the flow of molten metal and causing degradation of surface texture of cast materials. The solidified molten metal also adheres to the moving mold (e.g., rolls) and may become the cause of generation of surface defects in cast materials.

The present invention has been made under the above-described circumstances. One of the objects of the present invention is to provide a composite material suitable for forming parts for continuous casting with which deterioration and wear of the parts and compositional changes of the molten metal are suppressed despite extended casting time, the molten metal is inhibited from flowing into the gap between the nozzle and the moving mold, and cast materials having excellent surface quality can be continuously produced for a long period of time. Another object of the present invention is to provide a part for continuous casting, in particular, a continuous casting nozzle, that uses the composite material. Yet another object of the present invention is to provide a continuous casting method that uses a continuous casting nozzle, and a cast material and a magnesium alloy cast coil material obtained by the method.

Solution to Problem

The present invention achieves the objects described above by allowing at least part of a porous body having high mechanical strength and low reactivity to a molten metal such as molten pure magnesium or molten magnesium alloy to form a composite with a filler that has low wettability with the molten metal.

The composite material of the present invention relates to a composite material that constitutes at least part of a part for continuous casting used in continuous casting of molten pure magnesium or molten magnesium alloy. The composite material includes a porous body having pores and a filler incorporated in at least part of a portion that comes into contact with the molten metal, the portion being part of a surface portion of the porous body. The filler contains at least one selected from a nitride, a carbide, and carbon as a main component. These materials are materials (hereinafter referred to as molten-metal-repelling materials) that have low wettability with the molten metal compared to the porous body. Here, the surface portion refers to a three dimensional region having a particular depth from the surface of the porous body. Since the filler need be incorporated at least in the surface portion, the filler may be present not only in the surface portion but also in the inner side of the porous body. The main component of the filler refers to a component that accounts for 60 mass % or more of the filler.

When the composite material of the present invention is used, the molten metal of pure magnesium, a magnesium alloy, or the like can be repelled at a portion where the filler containing a molten-metal-repelling material is incorporated. Thus, when a part for continuous casting (in particular, a continuous casting nozzle) is made from this composite material, disturbance of molten metal flow during casting can be suppressed and cast materials having excellent surface quality can be obtained as a result. Due to the presence of the filler, damage to the porous body due to the heat of the molten metal, oxidation of molten metal, and penetration of the molten metal into the porous body can be easily suppressed. Thus, parts for continuous casting made by using the composite material of the invention are resistant to damage. As a result, cast materials having stable surface quality can be obtained over a long term. Moreover, since the composite material has a structure that includes a porous body and a filler incorporated in the pores thereof, the composite material can exhibit high toughness and be resistant to mechanical failure. According to the composite material of the present invention, continuous casting nozzles having thin walls and/or complicated shapes suitable for continuous casting can be produced. With nozzles having such a structure, the meniscus created at the time the molten metal is supplied to the moving mold can be decreased. As a result, the increase in size of ripple marks and generation of surface defects in cast materials can be suppressed.

Regarding the main component constituting the filler, a nitride is particularly resistant to corrosion caused by the reaction with magnesium since a nitride is a low-oxygen material. The nitride also has high heat conductivity and a low heat expansion property and thus undergoes less expansion and contraction by the heat from the molten metal and rarely separates from the porous body. Such a composite material has high toughness and resists mechanical failure. Moreover, deterioration caused by contact with molten metal and air is little and uniform molten metal flow can be easily maintained.

According to an embodiment of the composite material of the present invention, a coating layer is preferably further provided on a surface of the porous body in a portion incorporating the filler. In this case, the coating layer contains at least one selected from a nitride, a carbide, and carbon as a main component. The main component of the coating layer refers to a component that accounts for 60 mass % or more of the coating layer.

According to this structure, the portion where the coating layer is provided can more effectively repel the molten metal. Among the nitride, the carbide, and carbon, the nitride is not wetted by the molten metal, does not react with the molten metal, and highly repels the molten metal while exhibiting chemical stability. Since a nitride is a low-oxygen material substantially free of oxygen, the nitride is resistant to corrosion caused by the reaction with molten pure magnesium or molten magnesium alloy. Moreover, since a nitride has a high heat conductivity and low heat expansion property, the nitride expands and contracts less due to the heat from the molten metal and the coating layer rarely separates from the surface of the porous body and is resistant to failure.

According to an embodiment of the composite material of the present invention that includes the coating layer described above, the coating layer may contain alumina as a component other than the main component.

The density of the coating layer is an important factor among factors that determine the wettability of the coating layer with molten metal. It is also an important factor for durability of the layer, i.e., resistance to separation and failure, and the reactivity with the molten metal and air. Alumina has an effect of improving the density of the coating layer.

According to an embodiment of the composite material of the present invention, the relative density of the coating layer is preferably 30% or more and 95% or less and more preferably 40% or more and 85% or less.

The coating layer repels molten metal more as its density increases. Thus, when this composite material is used in a continuous casting nozzle, the molten metal is prevented from flowing into the gap between the nozzle and the moving mold. When the density of the coating layer is equal to or less than the upper limit described above, the heat conductivity of the coating layer can be decreased. Especially when the coating layer is provided to the nozzle member in a tip region that does not come into contact with the molten metal, the decrease in temperature of the molten metal caused by removal of heat from the nozzle member to the casting rolls can be suppressed and this is preferred for stable casting. The relative density here refers to a value determined by (density of coating layer)/(theoretical density of main component×main component content+theoretical density of auxiliary component×auxiliary component content)×100(%). The density of the main component of the coating layer is a value measured by bulk density measurement or an Archimedean method.

According to an embodiment of the composite material of the present invention, the thickness of the coating layer is 200 µm or more.

When the composite material is used in a part for continuous casting, an excessively thin coating layer may separate or break due to penetration of the molten metal and thus the thickness is preferably 200 µm or more. More preferably, the thickness is 300 µm or more. However, when the coating layer is excessively thick, the adhesion between the coating layer and the nozzle main body may decrease and the coating layer may separate from the porous body. Thus, the thickness is preferably 1000 µm or less and more preferably 500 µm or less.

According to an embodiment of the composite material of the present invention, the coating layer is formed by fixing powder to a surface of the porous body by a heat treatment.

An example of the method for forming the coating layer is a method that includes mixing powder (powder of the main component) serving as a raw material of the coating layer with particular amounts of a solvent and a binder to prepare a slurry, applying the slurry to the surface of the porous body, and heat-treating the applied slurry. The slurry may be applied with a brush or by spraying using an air spray. When the applied slurry is heat-treated, the powder is baked or sintered and a high-strength, high-hardness coating layer tightly adhering to the surface of the porous body is formed. The powder preferably has an average particle diameter such that the surface roughness Ra of the coating layer after the heat treatment is 10 µm or less. According to the powder fixing method, not only a coating layer that is strong and has low wettability is obtained but also the density can be easily controlled. Such a material may not have strength sufficient for use in the nozzle main body, but is preferred for use in the coating layer. Powder fixing also offers high productivity.

Other examples of the method for forming the coating layer include a CVD method and a PVD method. However, commercially available releasing agents (sprays) that are diluted with organic solvents to 20% or lower and that use organic binders are not preferred since the density is low, the adhering strength is low, the durability is poor, and the effects the present invention aim to achieve are not sufficiently achieved.

According to an embodiment of the composite material of the present invention, the flexural modulus of the porous body is preferably 90 GPa or less.

A continuous casting nozzle prepared by using a composite material that includes a flexible porous body having a flexural modulus of 90 GPa or less suffers less from defects and fracture and exhibits high durability even when the nozzle is thin-walled. Accordingly, a nozzle with reduced size and reduced thickness can be obtained, which is preferable for long continuous casting. Examples of the constituent materials of such a porous body include carbides and carbon. Since carbides and carbon have high mechanical strength, the nozzle becomes resistant to wear and deterioration during continuous use, exhibits high durability, and can be continuously used for a long time. Moreover, since the heat conductivity is high, variation in temperature at a portion that comes into contact with the molten metal can be suppressed to a low level. Moreover, since the oxygen content is low, bonding of magnesium with oxygen can be avoided. For example, the porous body is preferably formed of SiC fibers or carbon fibers compacted under pressure or a C/C composite (carbon-carbon composite, composite material containing carbon as a matrix and carbon fibers as a reinforcing material).

According to an embodiment of the composite material of the present invention, the heat conductivity of the porous body in a plane direction is preferably 15 W/m·K or more.

When a continuous casting nozzle is prepared by using a composite material that includes a porous body having a heat conductivity of 15 W/m·K or more in the plane direction, the temperature of the continuous casting nozzle can be made uniform in the plane direction during casting. As a result, the temperature of the molten metal in the plane direction during casting can be made uniform, molten metal in the moving mold can be uniformly solidified, and cast materials having excellent surface texture can be obtained. Examples of the material for such a porous body include materials composed of carbon and SiC.

A part for continuous casting according to the present invention is a part for continuous casting used in continuous casting of pure magnesium or a magnesium alloy, in which at least part of a portion that comes into contact with a molten metal of pure magnesium or a magnesium alloy is composed of the composite material of the present invention.

When the part for continuous casting is formed by using the composite material of the present invention, the reaction with magnesium can be suppressed, wear and deterioration caused by oxidation by the molten metal and penetration of the molten metal can be suppressed, the durability can be improved, and continuous casting can be continued for a longer period of time.

A continuous casting nozzle according to the present invention supplies a molten metal of pure magnesium or a magnesium alloy to a moving mold for continuous casting and is composed of a composite material of the present invention.

When a composite material of the present invention is used to form a continuous casting nozzle, the reaction with magnesium can be suppressed, wear and deterioration caused by oxidation by the molten metal and penetration of the molten metal can be suppressed, the durability can be improved, and continuous casting can be continued for a longer period of time. Moreover, in the interior of the nozzle serving as a channel for the molten metal, the molten metal flow can be maintained uniform and local disturbance of the molten metal flow can be prevented.

According to an embodiment of the continuous casting nozzle of the present invention, a coating layer that has low wettability with the molten metal compared to the porous body of the composite material is provided at least in a tip region that extends from a movable-mold-side tip surface to an outer peripheral surface, the tip region being part of a surface of the continuous casting nozzle. In this case, the coating layer contains at least one selected from a nitride, a carbide, and carbon as the main component.

When the tip region of the continuous casting nozzle is composed of the composite material of the present invention, the molten metal does not easily flow into a gap between the nozzle and the moving mold. Thus, local disturbance of the flow of the molten metal in the gap is avoided, solidification of the molten metal can be prevented, and a cast material having excellent surface quality can be obtained.

A continuous casting method of the present invention includes performing twin-roll casting using the continuous casting nozzle of the present invention and a twin-roll-type moving mold.

When continuous casting is conducted by a twin-roll method, the mold surface (surface of the mold that contacts the molten metal) can be easily retained at a particular position and rapid cooling is also possible. Since the surface that contacts the molten metal continuously appears with rotation of the rolls, productivity is high and application of a releasing agent and removal of adhered matter can be efficiently performed before the surface used for casting makes contact with the molten metal again, thereby simplifying the facility in which processes such as application and removal are performed. Naturally, the continuous casting nozzle according to the present invention can also be used in any continuous casting other than the twin-roll casting.

According to an embodiment of the continuous casting method of the present invention, twin-roll casting is preferably conducted while a continuous casting nozzle is arranged to face a twin-roll-type moving mold such that $D1<1.4\times D2$ where D1 is the thickness of a meniscus portion of the molten metal in a gap between the continuous casting nozzle and the twin-roll-type moving mold and D2 is the distance between the rolls. With this structure, the molten metal can be rapidly cooled and cast materials having stable quality can be produced for a long time.

The continuous casting nozzle is preferably as close to the moving mold as possible. If the gap between the continuous casting nozzle and the moving mold is large, the molten metal leaks into the gap, solidifies therein, and attaches to the moving mold, thereby causing surface defects in the cast materials. Moreover, stable and rapid cooling becomes difficult and satisfactory quality is rarely obtained. If the continuous casting nozzle contacts the moving mold, the continuous casting nozzle is cooled, and the molten metal inside the nozzle is also cooled and may solidify before it contacts the moving mold. In contrast, when the continuous casting nozzle is arranged to face the moving mold so that $D1<1.4\times D2$, these problems can be effectively avoided. Cast materials having excellent surface texture can be made by continuous casting that uses the continuous casting nozzle according to the present invention with D1 and D2 satisfying the aforementioned relationship.

A cast material of the present invention is produced by the continuous casting method of the present invention described above.

The cast material obtained by the continuous casting method of the present invention has uniform surface texture.

A magnesium alloy cast coil material of the present invention is produced by winding the cast material of the present invention and the length of the cast material is 100 m or more.

According to the continuous casting method of the present invention, a cast material of the present invention free of defects over a length of 100 m or more can be obtained. The magnesium alloy cast coil material of the present invention can be made by winding the cast material of the present invention.

In the present invention, pure magnesium refers to a material that contains 99.0 mass % or more of Mg component on a mass basis without intentionally adding other elements and a magnesium alloy refers to a material that contains an additive element and the balance being Mg and impurities. The additive element is, for example, at least one element selected from the group consisting of Al, Zn, Mn, Si, Cu, Ag, Y, Zr, Ca, Sr, Sn, Li, Ce, Be, Ni, Au, and a rare earth element (excluding Y and Ce). Such an additive element is preferably contained in an amount of 7.3 mass % or more in the magnesium alloy. Examples of the magnesium alloy containing an additive element include AZ series, AS series, AM series, and ZK series alloys according to the ASTM naming system. A magnesium alloy containing 7.3 to 12 mass % of Al and a magnesium alloy containing a total of 0.1 mass % or more of at least one selected from Y, Ce, Ca, and a rare earth element are particularly preferable since they have high strength and high corrosion resistance. The continuous casting nozzle according to the present invention can also be used in continuous casting of a composite material containing a magnesium alloy and a carbide and a composite material containing a magnesium alloy and an oxide.

Advantageous Effects of Invention

According to a composite material of the present invention, a molten metal of pure magnesium or a magnesium alloy or the like can be repelled at a portion incorporating a filler. Thus, when a part for continuous casting (especially a continuous casting nozzle) is produced by using the composite material, the disturbance of the molten metal flow during casting can be suppressed and as a result cast materials with excellent surface quality can be obtained.

BRIEF DESCRIPTION OF DRAWINGS

FIG. 1(A) is a schematic diagram of a continuous casting apparatus in which a molten metal is supplied to a moving mold and FIG. 1(B) is a schematic view of a continuous casting nozzle which has a different form from a continuous casting nozzle equipped in the apparatus of FIG. 1(A).

DESCRIPTION OF EMBODIMENTS

Embodiments of the present invention are described below with reference to drawings.

Embodiments

Composite Material

A composite material of the present invention constitutes at least part of a part for continuous casting used in continuous casting of molten pure magnesium or molten magnesium alloy. The composite material includes a porous body having pores and a filler incorporated in at least part of a portion that comes into contact with the molten metal, the portion being part of a surface portion of the porous body. The surface portion of the porous body refers to a region from the surface of the porous body to a depth of 5% of the depth of the porous body. Naturally, the filler may be present at a position deeper than the surface portion.

[Porous Body]

A body formed by compression-molding silicon carbide fibers or carbon fibers into a compact and baking the compact can be used as the porous body. The form of carbon fibers is not limited and may be staple fibers or filament fibers. A commercially available porous body may also be used (e.g., a porous carbon substrate having an average pore size of about 5 μm). In particular, a C/C composite is most preferable. Alternatively, a porous body composed of alumina or alumina fibers or the like can also be used.

The size of the porous body may be any but the porosity is preferably 30 to 70%. A sufficient amount of filler fills the pores at a porosity of 30% or more, the mechanical strength can be maintained at a porosity of 70% or less.

[Filler]

The filler incorporated in the pores of the porous body contains, as a main component, a material (hereinafter referred to as a molten-metal-repelling material) having low wettability with the molten metal compared to the porous body. Examples of the material include nitrides such as AlN, BN, and SiN, carbides such as SiC and TaC, and C. BN is particularly preferable. The main component refers to a component that accounts for 60 mass % or more of the filler.

The percentage of pores filled with the filler relative to pores in the surface portion of the porous body is preferably 80% or more. In this manner, the composite material can sufficiently repel the molten metal and can have improved strength.

The average particle size of the molten-metal-repelling material is preferably 20 or less depending on the size of the pores. As the average particle size decreases, the surface area of the molten-metal-repelling material increases and the composite material repels the molten metal more. Thus, the average particle size is preferably 5 μm or less. In view of the handling ease of the molten-metal-repelling material, the average particle size is preferably 1 μm or more. The molten-metal-repelling material content relative to the porous body is preferably 10 to 70 mass %. At a boron nitride content of 10 mass % or more, the composite material can sufficiently repel the molten metal. The composite material can retain sufficient mechanical strength at a content of 70 mass % or less.

The filler may contain a binder, such as alumina, that makes the filling state of the filler denser in addition to the molten-metal-repelling material. For example, a binder such as alumina is added to the filler containing the molten-metal-repelling material so that the binder functions as an adhesive and tightly fixed the molten-metal-repelling material to the pores.

The average particle size of the binder is preferably 1 μm or less. When the average particle size of the binder is 1 μm or less, the molten-metal-repelling material can be tightly fixed to the pores. The binder content in the filler is preferably 0.1 to 30 mass % relative to the molten-metal-repelling material. At a content of 0.1 mass % or more, the molten-metal-repelling material can be tightly fixed to the pores and at a content of 30 mass % or less, the blend ratio relative to the molten-metal-repelling material can be made low and thus the molten-metal-repelling material can sufficiently repel the molten metal.

An example of the method for causing the filler to be incorporated in the pores of the porous body is a method that includes immersing a porous body in a slurry containing a powdery molten-metal-repelling material (and a binder if needed) dispersed in an organic solvent or a water medium so that the pores are infiltrated with the filler. When the porous body is left in this state for a particular length of time, the filler settles in the pores and not only the surface portion of the porous body but also the inner side of the porous body is filled with the filler. Then the solvent is removed by drying and a heat treatment at a temperature of 600 to 800° C. is performed to fix the filler to the pores. As a result, a desired composite material can be obtained.

Other methods for causing the filler to be incorporated in the pores of the porous body include a vapor phase method and a chemical vapor infiltration (CVI) method. The CVI method includes introducing a source gas around a porous body placed in a closed chamber and causing a filler to coat the inside of the pores of the porous body.

[Coating Layer]

The composite material of the present invention may further include a coating layer, which has low wettability with the molten metal compared to the porous body, on a surface of the porous body in a portion where the filler is contained. When a coating layer is provided, the ability to repel molten metal can be further strengthened at the position where the coating layer is provided.

The structure of the coating layer may be basically the same as the structure of the filler described above. In other words, as with the filler described above, the coating layer contains, as a molten-metal-repelling material, one selected from a nitride such as AlN, BN, or SiN, a carbide such as SiC or TaC, and carbon. The coating layer may contain a binder, such as alumina, that increases the density of the coating layer in addition to the molten-metal-repelling material.

The binder (alumina) content in the coating layer is preferably 2 to 10 mass % relative to the molten-metal-repelling material, i.e., the main component of the coating layer (in other words, when the amount of molten-metal-repelling material is 100 on a mass percent basis, the amount of alumina is 2 to 10).

The coating layer can be formed by fixing a powder, which is a raw material of the coating layer, to the surface of a porous body by a heat treatment. For example, in the case where a coating layer containing BN as a main component and alumina as a component other than the main component is to be formed, a slurry containing BN powder and alumina powder is first prepared. Then the slurry is applied to the surface of a porous body, followed by a heat treatment. The average particle size of the BN powder is preferably 5 µm or less and the average particle size is preferably 1 µm or less. In this manner, the surface of the coating layer 3 can be made smooth.

The thickness of the coating layer is preferably 200 µm or more. When the coating layer is excessively thin, the coating layer may separate from the surface of the porous body as it comes into contact with the molten metal. More preferably, the thickness is 300 µm or more. When the coating layer is excessively thick, the adhesion between the coating layer and the porous body is decreased and the coating layer may separate from the porous body. Thus, the thickness of the coating layer is preferably 1000 µm or less and more preferably 500 µm or less. When the coating layer is composed of pure BN, the coating layer may become brittle and break at an excessively large thickness.

<<Continuous Casting Apparatus>>

Next, an example in which the composite material of the present invention described above is applied to a continuous casting apparatus is described. FIG. 1(A) is a schematic structural diagram of a continuous casting apparatus that supplies a molten metal 10 such as molten pure magnesium or molten magnesium alloy to a moving mold 20. This apparatus includes a melting furnace (not shown) that melts pure magnesium or a magnesium alloy into a molten metal 10, a tundish 30 that temporally stores the molten metal 10 from the melting furnace, a launder 31 used to transfer the molten metal 10 from the melting furnace to the tundish 30, and a nozzle 1 through which the molten metal 10 is supplied from the tundish 30 to the moving mold 20. A pair of rolls 21 (moving mold 20) used in casting the molten metal 10 into a cast material 100 is also included.

The nozzle 1 is tubular and the inner peripheral side thereof serves as a transfer path for the molten metal 10. One end of the nozzle 1 has an opening and is used as a supply port 4 through which the molten metal 10 is supplied to the movable mold 20. The supply port 4 has a rectangular shape that matches the cross section of the cast material 100 and satisfies the relation ship, long side of supply port 4 (width of cast material 100)>>short side of supply port 4 (thickness of cast material 100). The long side and the short side of the supply port 4 are adequately altered depending on the desired width and thickness of the cast material 100. Alternatively, barriers may be formed on both sides of the supply port 4 to change the width of the cast material 100. The other end of the nozzle 1 is fixed to the tundish 30. The launder 31 is connected to the tundish 30 and the molten metal 10 from the melting furnace is supplied to the tundish 30 through the launder 31. The molten metal 10 is transferred from the tundish 30 to the nozzle 1 and to the gap between the rolls 21 from the nozzle 1. The rolls 21 are each a cylindrical member, are arranged to face each other with a particular gap therebetween, and rotate in directions opposite from each other as indicated by arrows in FIG. 1. The gap between the rolls 21 is adjusted according to the desired thickness of the cast material 100 and is preferably equal to or slightly smaller than the short side of the supply port 4 of the nozzle 1. A water channel 22 is formed inside each roll 21 and water is distributed as necessary. The surfaces of the rolls 21 are cooled by this water. In other words, the rolls 21 are equipped with water-cooling structures.

When the nozzle 1 and the rolls 21 are used to perform casting, a cast material 100 can be obtained. The molten metal 10 is gradually cooled as it is transferred in the nozzle 1 and supplied to the gap between the rolls 21 from the supply port 4 at the tip of the nozzle 1. The molten metal 10 supplied is rapidly cooled and solidified as it contacts the rotating rolls 21, and discharged from the gap between the rolls 21 as a cast material 100. A long cast material 100 is obtained by continuously supplying the molten metal 10 to the gap between the rolls 21 as described above. In this example, a sheet-shaped cast material 100 is produced.

The feature of the present invention is that parts of the continuous casting apparatus are composed of the composite material described above. Examples of the parts of the continuous casting apparatus include the nozzle 1, the tundish 30, the launder 31, and barriers (not shown in the drawing). These parts for continuous casting are composed of the composite material at least in parts that contact the molten metal 10. Furthermore, when the portions that come into contact with the molten metal 10 are entirely composed of the composite material, wear and deterioration of the parts for continuous casting can be further suppressed. Alternatively, the parts for continuous casting as a whole may be composed of the composite material. For example, the entire nozzle 1 may be formed as a porous body 2 and a filler may be incorporated in the surface portion of the porous body 2 to suppress the damage on the porous body 2 (nozzle 1) due to the heat from the molten metal 10 and penetration of the molten metal 10 into the porous body. As a result, the surface quality of the cast material 100 can be improved.

The nozzle 1 is preferably arranged to face the rolls 21 such that $D1<1.4 \times D2$ where D1 is the thickness (maximum thickness) of the meniscus portion formed in the gap between the nozzle 1 and the rolls 21 and D2 is the distance between the rolls 21. In this manner, the distance d between the nozzle 1 and the rolls 21 can be controlled to an adequate value regardless of the size of the nozzle 1 and the rolls 21. D1 and D2 can be confirmed by interrupting the casting.

Another form of the nozzle 1 is shown in FIG. 1(B). A coating layer 3 may be formed in a portion (cross-hatched portion in the drawing) in a tip region 1r of the nozzle 1. In this manner, the molten metal 10 is inhibited from flowing into the gap between the nozzle 1 and the moving mold 20. As a result, a cast material 100 having high surface quality can be obtained. The tip region 1r of the nozzle 1 is a moving-mold-20-side region of the nozzle 1 that covers a tip surface between the inner peripheral edge and the outer peripheral edge of the nozzle 1 and a region that continuously extends from the tip surface of the nozzle 1 to the outer peripheral surface of the nozzle 1. The same coating layer as that described in relation to the composite material can be used as the coating layer 3.

<<Advantages>>

When a part for continuous casting is composed of the composite material of the present invention, wear and deterioration caused by oxidation by the molten metal 10 and penetration of the molten metal 10 are suppressed, the durability of the part can be enhanced, and a nozzle having a shape suitable for casting, such as thin-walled and small-size nozzle, can be formed. Accordingly, the continuous casting can be continued for a longer time.

In particular, when the nozzle 1 for continuous casting is composed of the composite material, a uniform flow of the molten metal 10 can be easily maintained inside the nozzle 1 serving as a transfer channel, and local disturbance of the molten metal flow can be prevented. As shown in FIG. 1(B), when a coating layer 3 is provided on the tip region 1r of the nozzle 1, the molten metal 10 is inhibited from flowing into the gap between the nozzle 1 and the moving mold 20. Thus local disturbance of the molten metal flow is prevented and solidification of the molten metal 10 can be avoided in that gap, and a cast material 100 having high surface quality can be obtained.

Test Example 1

In this example, the influence of a filler on a resulting cast material composed of a magnesium alloy was investigated.

[Sample 1]

A porous body 2 having the shape of the nozzle 1 was prepared by compression-molding and baking silicon carbide fibers. The thickness of the tip of the porous body 2 was 1 mm and the width was 300 mm. The porosity of the porous body 2 was 45% and the flexural modulus of the porous body 2 was 90 GPa. The heat conductivity of the porous body 2 in a plane direction was 17 W/m·K.

Next, the pores in the surface portion of the porous body 2 were filled with aluminum nitride having an average particle diameter of 1 μm. The ratio of pores filled with aluminum nitride relative to pores in the porous body 2 was 90%. In filling the pores of the porous body 2 with aluminum nitride, a slurry containing aluminum nitride having an average particle diameter of 1 μm and alumina powder having an average particle diameter of 0.8 μm was first prepared (ratio of the alumina powder to the aluminum nitride powder was 5:100 on a mass percent basis). Next, the porous body 2 was immersed in the slurry and the pores in the surface portion of the porous body 2 were infiltrated with aluminum nitride. The solvent was removed by drying and a heat-treatment was performed at 800° C. to fix the aluminum nitride in the pores of the porous body 2.

A molten metal 10 of a magnesium alloy corresponding to AZ91 was supplied from the nozzle 1 to the moving mold 20 and a sheet-shaped cast material 100 having a thickness of 5 mm and a width of 300 mm was produced. The thickness D1 of the meniscus portion was 1.2 times the distance D2 between the rolls 21. The efficiency percentage of producing the cast material 100 by using a 0.5 t/lot of the molten metal 10 of the magnesium alloy was determined. The efficiency percentage is calculated by visually inspecting the surface texture of the produced cast material 100 and determining the ratio of the length of the cast material 100 from start of casting up to where the surface texture was deteriorated (due to cracking etc.) relative to the length of the cast material 100 cast by using all of the molten metal. The efficiency percentage and the structure of the nozzle 1 are shown in Table I.

After continuous casting, the parts for continuous casting (the nozzle 1, the tundish 30, and the launder 31) were visually inspected in portions that came into contact with the molten metal 10. Penetration of the molten metal was not observed and notable deterioration was not found.

[Sample 2]

Sample 2 was the same as Sample 1 except that the molten-metal-repelling material was BN powder having an average particle size of 0.6 μm and that the porous body 2 had a nozzle shape prepared by compression-molding and baking carbon fibers.

[Sample 3]

Sample 3 was the same as Sample 2 except that the filler was composed of SiC alone and that the entire surface portion of the nozzle 1 (porous body 2) was infiltrated with the filler by a chemical vapor infiltration method.

[Sample 4]

Sample 4 was the same as Sample 2 except that the filler was composed of C alone and that the entire surface portion of the nozzle 1 (porous body 2) was infiltrated with the filler by a chemical vapor infiltration method.

[Sample 5]

Sample 5 differed from Sample 2 in that an alumina porous body was used as the porous body 2. The flexural modulus of the alumina porous body was 180 GPa and the heat conductivity in the plane direction was 5 W/m·K. The nozzle composed of this material had poor strength and deterioration (chipping) of the nozzle tip portion was observed during casting. Moreover, it was difficult to determine settings that satisfy D<1.4×D2.

[Sample 6]

Sample 6 differed from Sample 1 in that the entire nozzle 1 was composed of a SiC fiber material alone. The dimensions of the nozzle 1, the cast parts, the casting method, and the method for calculating efficiency percentage were the same as those in Sample 1. After continuous casting, the parts for continuous casting (the nozzle 1, the tundish 30, and the launder 31) were visually inspected in portions that came into contact with the molten metal 10. Penetration of the molten metal was observed and deterioration was found.

[Results]

The general structures of Samples 1 to 6 described above and the efficiency percentages are shown in Table I. Note that the "fill ratio" in the table refers to a percentage of pores filled with a filler in the surface portion of the porous body 2 and was determined by observing a cross-section with an optical microscope in this test example.

TABLE I

| | Porous body | | | Filler | | | | |
| --- | --- | --- | --- | --- | --- | --- | --- | --- |
| Sample | Material | Flexural modulus (GPa) | Heat conductivity (W/m·K) | Material | Form in which pores were filled | Fill ratio (%) | D1 | Efficiency percentage (%) |
| 1 | SiC | 90 | 17 | AlN + alumina | Powder fixing | 90 | 1.2 × D2 | 95 |
| 2 | C | 50 | 15 | BN + alumina | Powder fixing | 92 | 1.2 × D2 | 95 |

TABLE I-continued

| | | Porous body | | Filler | | | | |
|---|---|---|---|---|---|---|---|---|
| Sample | Material | Flexural modulus (GPa) | Heat conductivity (W/m·K) | Material | Form in which pores were filled | Fill ratio (%) | D1 | Efficiency percentage (%) |
| 3 | C | 50 | 15 | SiC | Infiltration | 98 | 1.2 × D2 | 90 |
| 4 | C | 50 | 15 | C | Infiltration | 98 | 1.2 × D2 | 95 |
| 5 | Alumina | 180 | 5 | BN + alumina | Powder fixing | 92 | 1.5 × D2 | 40 |
| 6 | SiC | 90 | 17 | None | | | 1.2 × D2 | 20 |

Comparison between Samples 1 to 5 in which the filler was incorporated in the porous body 2 and Sample 6 in which the filler was not incorporated finds that the incorporating the filler in the porous body 2 improves the efficiency percentage. This is presumably due to low wettability of the filler to the molten metal 10 since the molten metal 10 is repelled by the filler and the molten metal 10 is inhibited from flowing into the inside of the nozzle 1 and the gap between the nozzle 1 and the moving mold 20. In other words, deterioration or deformation of the parts does not occur and the molten metal 10 supplied from the nozzle 1 to the moving mold 20 can flow smoothly. Thus, the molten metal flow is not disturbed locally in the gap between the nozzle 1 and the moving mold 20, solidification of the molten metal 10 can be prevented, and a cast material 100 having high surface quality can be obtained for a long period of time.

Comparison between Samples 1 to 4 and Sample 5 finds that the efficiency percentage is higher in Samples 1 to 4 in which the flexural modulus of the porous body 2 is 90 GPa or less and the heat conductivity is 15 W/m·K or more than in Sample 5. This is presumably due to high toughness, high heat conductivity, low-oxygen content, and high mechanical strength since wear and deterioration are suppressed despite continuous use, the durability is high, and long-term continuous use is possible. In other words, the molten metal 10 supplied from the nozzle 1 to the moving mold 20 can smoothly flow.

Test Example 2

In Test Example 2, as shown in FIG. 1(B), the coating layer 3 was further formed in the tip region 1r of the nozzle 1 and the influence of the coating layer 3 on the cast material was investigated.

The nozzle 1 used in preparing Sample 4 of Text Example 1 was first prepared. A slurry containing 5 mass % of alumina powder having an average particle diameter of 0.8 μm relative to boron nitride powder was prepared. Then the slurry was applied onto the tip region 1r of the porous body 2 by spraying and heat-treated at a temperature of 800° C. As a result, boron nitride was fixed to the surface of the tip region of the porous body 2 and the coating layer 3 was made. The surface roughness Ra (arithmetic mean roughness) of the coating layer 3 was 5 μm and the thickness of the coating layer 3 was 200 μm. The relative density of the boron nitride was 95%. The surface roughness Ra was measured according to the method designated in JIS B 0601. Specifically, the surface roughness Ra is an average of values measured at five points at a measurement length of 3 mm.

Continuous casting was performed by using the nozzle 1 having the coating layer 3 described above. The efficiency percentage of the cast material was 99% or more. This shows that infiltrating the entire surface portion of the porous body 2 with a filler and forming the coating layer 3 on the surface of the tip region 1r can effectively suppress solidification of the molten metal 10 in the gap between the nozzle 1 and the rolls 21 and that cast materials having high surface quality can be obtained more stably in this manner. In other words, the tip region 1r that extends from the tip surface of the nozzle 1 over the outer peripheral surface of the nozzle 1 greatly influences the surface quality of the cast materials.

Test Example 2-1

In this test example, the influence of the presence and absence of the coating layer and the thickness of the coating layer on cast materials composed of magnesium alloys was investigated. However, in Test Example 2-1, the porous body 2 shown in FIG. 1(B) was not infiltrated with the filler and the coating layer 3 was formed on the tip region 1r of the porous body 2 (nozzle 1) to conduct testing. This is to investigate the pure influence of the coating layer 3 on the cast materials. This also applies to Test Example 2-2 below.

[Sample α1]

A part (hereinafter referred to as a nozzle main body) having the shape of the nozzle 1 was prepared by processing a porous carbon. The thickness of the tip of the nozzle main body was 1 mm and the width was 300 mm.

A coating layer 3 was then formed in the tip region on the movable-mold-20 side of the nozzle main body to make a nozzle 1. The coating layer 3 was formed by preparing a slurry containing aluminum nitride powder and 10 mass % of alumina powder having an average particle diameter of 0.3 μm relative to the aluminum nitride powder, applying the tip region 1r of the nozzle main body with the slurry by spraying, and performing a heat-treatment at a temperature of 800° C. The surface roughness Ra (arithmetic mean roughness) of the coating layer 3 after the heat treatment was 5 μm, the thickness of the coating layer 3 was 300 μm, and the relative density of aluminum nitride was 65%. The surface roughness Ra was measured according to the method designated by JIS B 0601. In particular, the surface roughness was the average of values measured at five points at a measurement length of 3 mm.

The nozzle 1 having the coating layer 3 was arranged so that the distance d between the tip of the nozzle 1 disposed on the moving mold 20 side and the moving mold 20 was 50 μm. A molten metal 10 of a magnesium alloy corresponding to AZ91 was supplied from the nozzle 1 to the moving mold 20 and a sheet-shaped cast material 100 having a thickness of 5 mm and a width of 300 mm was produced. The thickness D1 of the meniscus portion at that time was 1.2 times the distance D2 between the rolls 21. The failure percentage of producing the cast material 100 by using 0.5 t/lot of the molten metal 10 of the magnesium alloy was calculated. The produced cast material 100 was visually inspected to check portions with poor surface texture (dented or cracked portions etc.) caused by leakage of the molten metal 10 into a gap between the nozzle 1 and the rolls 21, and the ratio of the length of the cast material determined as fail relative to the length of a cast material produced by casting all of the molten metal was calculated and assumed to be the failure percentage. The failure percentage and the structure of the nozzle 1 are indicated in Table II.

[Samples α2 and α3]

Samples α2 and α3 differed from Sample α1 only in the thickness of the coating layer 3. The dimensions of the nozzle main body composed of carbon, the dimensions of the coating layer 3 other than the thickness, the casting method, and the failure percentage calculation method were the same as those in Sample α1.

[Sample α4]

Sample α4 differed from Sample α1 in that the coating layer 3 was composed of AlN alone, the thickness of the coating layer 3 was 5 μm, and the relative density was 29%. The rest was the same as Sample α1.

[Sample α5]

Sample α5 was the same as Sample α1 except that the coating layer 3 was not provided in the tip region of the nozzle main body unlike in Sample α1.

[Results]

TABLE II

| Sample | Nozzle main body Material | Coating layer Material | Thickness (μm) | Relative density (%) | D1 | Failure percentage (%) |
|---|---|---|---|---|---|---|
| α1 | Carbon | AlN + alumina | 300 | 65 | 1.2 × D2 | 2 |
| α2 | Carbon | AlN + alumina | 900 | 65 | 1.2 × D2 | 3 |
| α3 | Carbon | AlN + alumina | 30 | 65 | 1.2 × D2 | 40 |
| α4 | Carbon | AlN | 5 | 29 | 1.2 × D2 | 50 |
| α5 | Carbon | None | | | 1.2 × D2 | 95 |

Comparison between Samples α1 to α4 in which a nozzle 1 having a coating layer 3 is used and Sample α5 in which a nozzle not having a coating layer 3 is used finds that the failure percentage can be decreased by providing the coating layer 3. This is presumably because a coating layer 3 having low wettability with the molten metal 10 and being formed in the tip region 1r of the nozzle 1 repels the molten metal 10 and thus the molten metal 10 is inhibited from flowing into the gap between the nozzle 1 and the moving mold 20. Thus, the molten metal flow is not locally disturbed in the gap between the nozzle 1 and the moving mold 20, solidification of the molten metal 10 can be prevented, and a cast material 100 having excellent surface quality can be obtained.

Comparison between Samples α1 to α4 shows that the failure percentage can be significantly lowered by adjusting the thickness of the coating layer 3 to be within the range of 200 to 1000 μm.

The results in Test Example 2-1 show that the thickness of the coating layer 3 affects the quality of the cast materials. It is presumed based on these results that it is important to adjust the thickness of the coating layer 3 in the case where a coating layer 3 is formed on a porous body 2 incorporating the filler.

Test Example 2-2

The influence of the difference in D1 that indicates the positional relationship between the nozzle 1 and the rolls 21 on the cast materials was investigated. The general structures of the samples and the results are shown in Table III.

[Sample α6]

Sample α6 was the same as Sample α2 except that the main component of the coating layer 3 was SiC, the thickness of the coating layer 3 was 200 μm, and the relative density was 70%.

[Sample α7]

Sample α7 was the same as Sample α6 except that the main component of the coating layer 3 was BN and the relative density was 95%.

[Sample α8]

Sample α8 was the same as Sample α6 except that a nozzle main body (not a porous member) composed of molybdenum was used and that D1=1.3×D2.

[Sample α9]

Sample α9 was the same as Sample α6 except that a nozzle main body composed of alumina was used, the main component of the coating layer 3 was BN, the relative density of the coating layer 3 was 80%, and D1=1.5×D2.

[Sample α10]

Sample α10 differed from Sample α6 only in that D1=1.5×D2.

[Results]

TABLE III

| Sample | Nozzle main body Material | Coating layer Material | Thickness (μm) | Relative density (%) | D1 | Failure percentage (%) |
|---|---|---|---|---|---|---|
| α6 | Carbon | SiC + alumina | 200 | 70 | 1.2 × D2 | 2 |
| α7 | Carbon | BN + alumina | 200 | 95 | 1.2 × D2 | 10 |
| α8 | Molybdenum | SiC + alumina | 200 | 70 | 1.3 × D2 | 3 |
| α9 | Alumina | BN + alumina | 200 | 80 | 1.5 × D2 | 45 |
| α10 | Carbon | SiC + alumina | 200 | 70 | 1.5 × D2 | 30 |

Comparison between Samples α6 to α10 shows that the failure percentage of cast materials can be lowered when D1<1.4×D2. This is presumably due to the fact that when the nozzle 1 is excessively distant from the rolls 21, the molten metal leaks into the gap therebetween and solidifies and adheres to the nozzle 1, thus failing to achieve satisfactory cooling conditions.

The results of Test Example 2-2 show that the difference in D1 indicating the positional relationship between the nozzle 1 and the rolls 21 affects the quality of the cast materials. Based on these results, it is presumed that adjusting D1 is also important in the case of using a porous body 2 incorporating a filler.

Test Example 3

In this test example, whether the composite material of the present invention can be effectively used in parts for continuous casting other than the nozzle 1 was investigated.

Parts for continuous casting, namely, a tundish 30 and a launder 31, having the same shapes as the tundish and the launder of Sample 1 were formed by using porous bodies (C/C composites) made by baking compaction-molded carbon fibers. Then the pores of the carbon fibers in portions that come into contact with a molten metal were filled with a filler containing boron nitride and alumina. The tundish 30 and the launder 31 differed from those of Sample 1 in the materials used. The materials that form the nozzle 1, the dimensions of the nozzle 1, the dimensions of the tundish 30 and launder 31, and the casting method were the same as those in Sample 1.

Continuous casting was performed by using the tundish 30 and the launder 31 described above. Then the portions of the parts for continuous casting (nozzle 1, tundish 30, and launder 31) that came into contact with the molten metal 10 were visually inspected. As a result, penetration of the molten metal was not observed in the portions that came into contact with the molten metal 10 and notable deterioration was not observed.

The embodiments described above are subjected to alterations and modifications without departing from the spirit of the present invention. The scope of the present invention is not limited by the structures described above.

INDUSTRIAL APPLICABILITY

A composite material of the present invention is suitable for use as a material for forming parts for continuous casting used in continuous casting of pure magnesium or magnesium alloys. Moreover, parts for continuous casting made of this composite material, in particular, a continuous casting nozzle, is optimum for performing long-term continuous casting that produces cast materials having excellent surface texture.

REFERENCE SIGNS LIST

1 nozzle (continuous casting nozzle)
1r tip region
2 porous body
3 coating layer
4 supply port
10 molten metal
100 cast material
20 moving mold
21 roll
22 water channel
30 tundish
31 launder

The invention claimed is:

1. A composite material that constitutes at least part of a part for continuous casting used in continuous casting of a molten metal of pure magnesium or a magnesium alloy, the composite material comprising:
  a porous body having pores; and
  a filler incorporated in at least part of a portion that comes into contact with the molten metal, the portion being part of a surface portion of the porous body,
  wherein the filler contains at least one selected from a nitride, a carbide, and carbon as a main component, and
  a percentage of pores filled with the filler relative to pores in the surface portion of the porous body is 80% or more.

2. The composite material according to claim 1, further comprising:
  a coating layer on a surface of the porous body in the portion where the filler is incorporated,
  wherein the coating layer contains at least one selected from a nitride, a carbide, and carbon as a main component.

3. The composite material according to claim 2, wherein the coating layer contains alumina as a component other than the main component.

4. The composite material according to claim 2, wherein the coating layer has a relative density of 30% or more and 95% or less.

5. The composite material according to claim 2, wherein the coating layer has a thickness of 200 µm or more.

6. The composite material according to claim 2, wherein the coating layer is a layer formed by fixing a powder to a surface of the porous body by a heat treatment.

7. The composite material according to claim 1, wherein the porous body has a flexural modulus of 90 GPa or less.

8. The composite material according to claim 1, wherein the porous body has a heat conductivity of 15 W/m·K or more in a plane direction of the porous body.

9. A part for continuous casting used in continuously casting pure magnesium or a magnesium alloy,
  wherein at least part of a portion that comes into contact with a molten metal of pure magnesium or a magnesium alloy is composed of the composite material according claim 1.

10. A continuous casting nozzle used for supplying a molten metal of pure magnesium or a magnesium alloy to a moving mold for continuous casting,
  wherein the continuous casting nozzle is formed of the composite material according to claim 1.

11. The continuous casting nozzle according to claim 10, including a coating layer at least in a tip region that extends from a movable-mold-side tip surface to an outer peripheral surface, the tip region being part of a surface of the continuous casting nozzle, the coating layer having low wettability with the molten metal compared to the porous body of the composite material,
  wherein the coating layer contains at least one selected from a nitride, a carbide, and carbon as a main component.

12. A continuous casting method comprising performing twin-roll casting by using the continuous casting nozzle according to claim 10 and a twin-roll-type moving mold.

13. The continuous casting method according to claim 12, wherein the twin-roll casting is performed while arranging the continuous casting nozzle to face the twin-roll-type moving mold such that D1<1.4×D2,
  where D1 is a thickness of a meniscus portion of the molten metal in a gap between the continuous casting nozzle and the twin-roll-type moving mold and D2 is a distance between rolls.

14. A cast material produced by the continuous casting method according to claim 12.

15. The cast material according to claim 14, wherein the magnesium alloy contains a total of 7.3 mass % or more of at least one element selected from Al, Zn, Mn, Si, Cu, Ag, Y, Zr, Ca, Sr, Sn, Li, Ce, Be, Ni, Au, and a rare earth element (excluding Y and Ce), the balance being Mg and impurities.

16. The cast material according to claim 15, wherein the magnesium alloy contains more than 7.3 mass % but not more than 12 mass % of Al.

17. The cast material according to claim 16, wherein the magnesium alloy contains a total of 0.1 mass % or more of at least one element selected from Y, Ce, Ca, and a rare earth element (excluding Y and Ce) and the balance being Mg and impurities.

18. A magnesium alloy cast coil material produced by winding the cast material according to claim 15,
  wherein the cast material has a length of 100 m or more.

* * * * *